(12) United States Patent
Blanz et al.

(10) Patent No.: US 9,223,048 B2
(45) Date of Patent: Dec. 29, 2015

(54) SYSTEM AND METHOD TO DETECT A FLUID FLOW WITHOUT A TIPPING PULSE

(71) Applicants: Martin Blanz, Celle (DE); Thomas Kruspe, Niedersachen (DE)

(72) Inventors: Martin Blanz, Celle (DE); Thomas Kruspe, Niedersachen (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/551,979

(22) Filed: Nov. 24, 2014

(65) Prior Publication Data

US 2015/0077103 A1    Mar. 19, 2015

Related U.S. Application Data

(63) Continuation of application No. 13/352,796, filed on Jan. 18, 2012, now abandoned.

(51) Int. Cl.
| | | |
|---|---|---|
| G01V 3/00 | (2006.01) | |
| G01V 3/32 | (2006.01) | |
| G01F 1/56 | (2006.01) | |
| G01V 3/38 | (2006.01) | |

(52) U.S. Cl.
CPC .. *G01V 3/32* (2013.01); *G01F 1/56* (2013.01); *G01V 3/38* (2013.01)

(58) Field of Classification Search
CPC ..................................................... G01R 33/563
USPC .................................. 324/306, 307, 309, 314
See application file for complete search history.

(56) References Cited

U.S. PATENT DOCUMENTS

| | | | | |
|---|---|---|---|---|
| 5,278,501 | A | * | 1/1994 | Guilfoyle ....................... 324/303 |
| 6,268,727 | B1 | * | 7/2001 | King et al. ..................... 324/306 |
| 6,518,758 | B1 | * | 2/2003 | Speier et al. ................... 324/303 |
| 6,933,719 | B2 | * | 8/2005 | Thomann et al. .............. 324/303 |

* cited by examiner

*Primary Examiner* — Louis Arana
(74) *Attorney, Agent, or Firm* — Cantor Colburn LLP

(57) ABSTRACT

An apparatus and method to detect a fluid flow. The apparatus includes a nuclear magnetic resonance (NMR) tool to perform an NMR measurement on the fluid in a sensitive volume by establishing a magnetic field in the sensitive volume that exhibits a change in magnitude in a direction of the fluid flow when the fluid flow is radial with respect to the NMR tool and by transmitting refocus pulses, without any tipping pulse, to obtain the NMR measurement comprising spin echo signals. The system also includes a processor to receive the NMR measurement from the NMR tool and determine whether the fluid flow exists based on an amplitude of the NMR measurement.

20 Claims, 7 Drawing Sheets

SYSTEM AND METHOD TO DETECT A FLUID FLOW WITHOUT A TIPPING PULSE

CROSS-REFERENCE TO RELATED APPLICATION

This application is a continuation of U.S. application Ser. No. 13/352,796 filed Jan. 18, 2012, the disclosure of which is incorporated by reference herein in its entirety.

BACKGROUND OF THE INVENTION

Geologic formations are used for many purposes such as hydrocarbon production, geothermal production and carbon dioxide sequestration. In general, formations are characterized in order to determine whether the formations are suitable for their intended purpose.

One way to characterize a formation is to convey a downhole tool through a borehole penetrating the formation. The tool is configured to perform measurements of one or more properties of the formation at various depths in the borehole to create a measurement log.

Many types of logs can be used to characterize a formation. One type of downhole tool that can determine various properties of a formation is a nuclear magnetic resonance (NMR) tool. NMR tools may generate a static magnetic field in a sensitive volume surrounding the wellbore or may use the earth's magnetic field rather than generating a magnetic field. NMR is based on the fact that the nuclei of many elements have angular momentum (spin) and a magnetic moment. The nuclei have a characteristic Larmor resonant frequency related to the magnitude of the magnetic field in their locality. Over time the nuclear spins align themselves in part along an externally applied magnetic field, resulting in an equilibrium macroscopic nuclear magnetization. This equilibrium situation can be disturbed by a pulse of a magnetic field oscillating at the Larmor frequency, which tips the magnetization within the bandwidth of the oscillating magnetic field away from the static field direction.

After tipping, the magnetization precesses around the static field at a particular frequency known as the Larmor frequency. At the same time, the magnetization returns to the equilibrium direction (i.e., aligned with the static field) according to a characteristic relaxation time known as the spin-lattice relaxation time or $T_1$.

At the end of a $\theta=90°$ tipping pulse (also referred to as an excitation pulse), the magnetization points in a common direction perpendicular to the static field and then precesses at the Larmor frequency. However, because of inhomogeneity in the static field due to the constraints on tool shape, imperfect instrumentation, or microscopic material heterogeneities, each nuclear spin precesses at a slightly different rate. Hence, after a time long compared to the precession period, but shorter than $T_1$, the spins will no longer be precessing in phase. This de-phasing occurs with a time constant that is commonly referred to as $T_2^*$. In downhole applications, $T_2^*$ is mainly due to the non-uniformity of the static magnetic field. $T_2^*$ is often so short that the NMR signal that forms right after the tipping pulse is undetectable. It is, however, possible to rephase the spins by using so-called rephasing or refocusing pulses to generate a sequence of spin echoes. The standard pulse echo sequence for doing this is the Carr-Purcell-Meiboom-Gill (CPMG) sequence. The decay of the amplitudes of the spin echoes occurs with the spin-spin relaxation time $T_2$ and is due to properties of the material. Hence, a CPMG consists of one excitation pulse followed by a plurality of refocusing pulses, with the decaying NMR echoes forming between the refocusing pulses.

The NMR tool includes a receiving coil designed so that a voltage is induced by the precessing spins. Only that component of the nuclear magnetization that is precessing in the plane perpendicular to the static field is sensed by the coil. Signals received by the receiving coil are referred to as NMR signals and these signals are used to determine properties of the formation in the sensitive volume. NMR signals at the present time are used to determine porosity, hydrocarbon saturation, and permeability of rock formations. It would be well received in the drilling industry if additional properties could be determined using NMR tools.

BRIEF SUMMARY

According to one aspect of the invention, an apparatus to detect a fluid flow includes a nuclear magnetic resonance (NMR) tool configured to perform an NMR measurement on the fluid in a sensitive volume by establishing a magnetic field in the sensitive volume that exhibits a change in magnitude in a direction of the fluid flow when the fluid flow is radial with respect to the NMR tool and by transmitting refocus pulses, without any tipping pulse, to obtain the NMR measurement comprising spin echo signals; and a processor configured to receive the NMR measurement from the NMR tool and determine whether the fluid flow exists based on an amplitude of the NMR measurement.

According to another aspect of the invention, a method of detecting fluid flow includes performing a nuclear magnetic resonance (NMR) measurement on the fluid in a sensitive volume using an NMR tool configured to establish a magnetic field in the sensitive volume that exhibits a change in magnitude in a direction of the fluid flow when the fluid flow is radial with respect to the NMR tool and to transmit refocus pulses, without any tipping pulse, in the sensitive volume to obtain the NMR measurement, the NMR measurement comprising spin echo signals; and determining whether the fluid flow exits based on an amplitude of the NMR measurement.

According to yet another aspect of the invention, a non-transitory computer readable medium comprising computer executable instructions which, when executed by a processor, cause the processor to perform a method of estimating a property of a fluid flow. The method includes receiving a nuclear magnetic resonance (NMR) measurement on the fluid in a sensitive volume using an NMR tool configured to establish a magnetic field in the sensitive volume that changes in magnitude in a direction of the fluid flow, the NMR measurement comprising spin echo signals; determining a magnitude of frequency change of the spin echo signals from the NMR measurement; and estimating the property using the frequency change.

BRIEF DESCRIPTION OF THE DRAWINGS

Referring now to the drawings wherein like elements are numbered alike in the several Figures.

DETAILED DESCRIPTION

A detailed description of one or more embodiments of the disclosed apparatus and method presented herein by way of exemplification and not limitation with reference to the Figures.

Disclosed are apparatus and method for estimating a flow rate of formation fluid flowing into a borehole in an unbalanced well system. In an unbalanced well system an effective hydrostatic pressure in the borehole from drilling fluid is less than or greater than the pressure of downhole fluid (e.g., formation fluid, mud filtrate). This causes the downhole fluid to be drawn into or out of the borehole.

Figure 1:
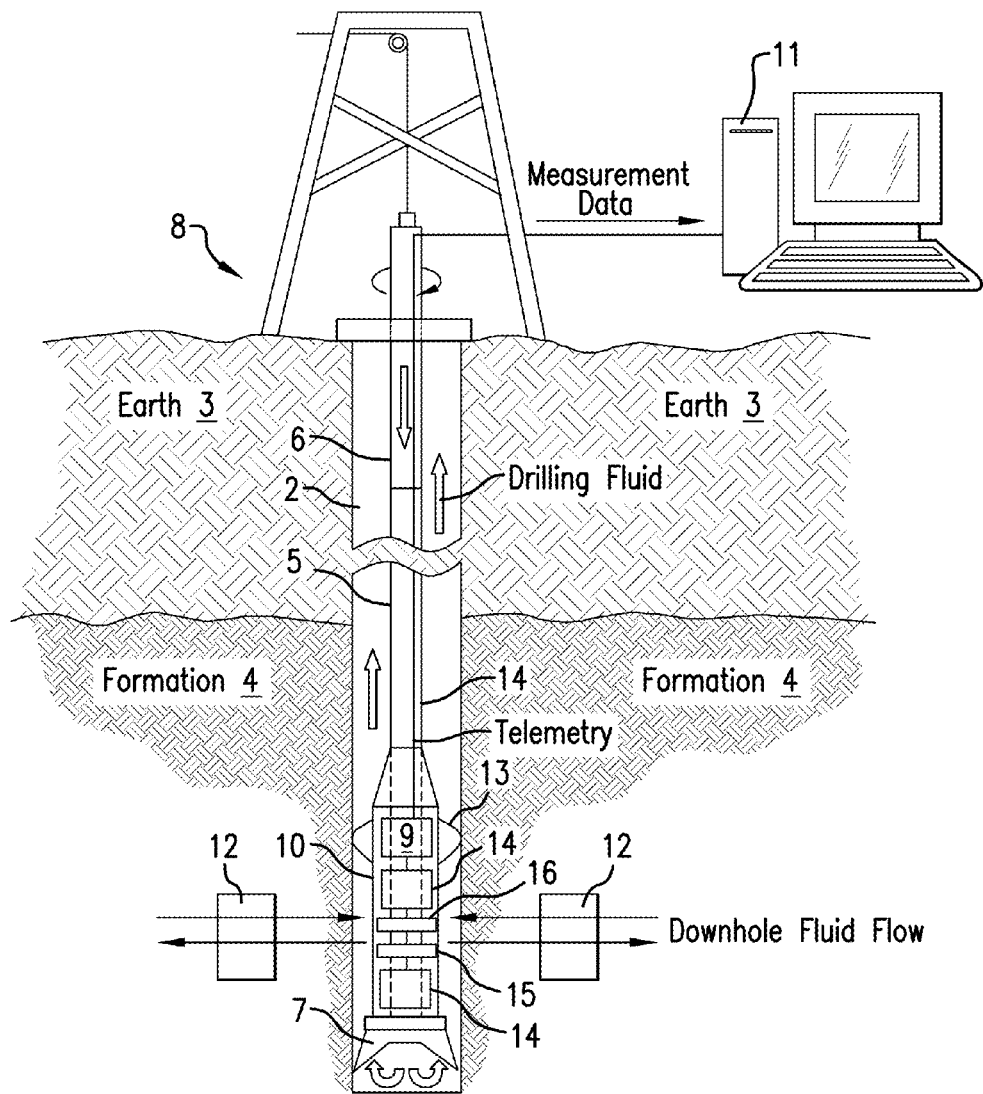
FIG. 1 illustrates a cross-sectional view of an exemplary embodiment of a nuclear magnetic resonance (NMR) tool disposed in a borehole penetrating the earth, which includes an earth formation.

FIG. 1 illustrates a cross-sectional view of an exemplary embodiment of a nuclear magnetic resonance (NMR) tool 10 disposed in a borehole 2 penetrating the earth 3, which includes an earth formation 4. The formation 4 represents any subsurface material of interest. The NMR tool 10 is conveyed through the borehole 2 by a carrier 5. In the embodiment of FIG. 1, the carrier 5 is a drill string 6 in an embodiment known as logging-while-drilling (LWD). Disposed at a distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. In one or more embodiments, a stabilizer 13 may be used to limit lateral movement of the NMR tool 10 in the borehole 2. Downhole electronics 9 are configured to operate the NMR tool 10 and/or process measurements or data received from the tool 10. Telemetry is used to provide communications between the NMR tool 10 and a computer processing system 11 disposed at the surface of the earth 3. NMR data processing or operations can also be performed by the computer processing system 11 in addition to or in lieu of the downhole electronics 9. The NMR tool 10 may operate intermittently, at particular intervals, or continuously during the drilling process. In an alternative embodiment, the carrier 5 can be an armored wireline in an embodiment known as wireline logging.

The NMR tool 10 includes NMR components configured to perform NMR measurements on a sensitive volume 12 in the formation 4. The sensitive volume 12 has a generally toroidal shape surrounding the borehole 2. The NMR components include an arrangement of magnets 14 that is configured to generate a static magnetic field having a decreasing field strength or magnitude with increasing radial distance from the NMR tool in the sensitive volume 12. A radio frequency (RF) coil 15 or antenna is used to produce pulsed RF fields substantially orthogonal to the static field in the sensitive volume 12. The nuclear spins in the sensitive volume 12 align themselves partly along the static magnetic field, applied by the magnets 14, forming a macroscopic nuclear magnetization. A pulsed RF field is applied to tip the nuclear magnetization into the transverse plane, resulting in a precession of the magnetization. Such a tipping pulse is followed by a series of refocusing pulses and the resulting series of pulse echoes (also referred to as spin echoes or NMR signals) is detected by a receiver coil 16 or antenna.

Figure 2:
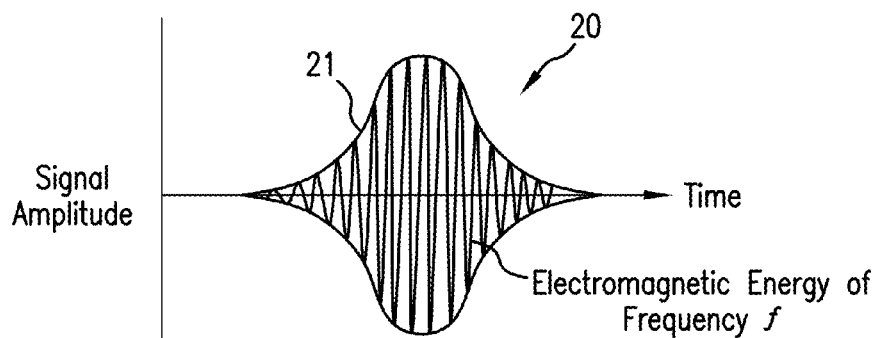
FIG. 2 depicts aspects of a nuclear spin echo pulse.

The pulse sequences may be in the form of a Carr-Purcell-Meiboom-Gill (CPMG) sequence or, alternatively, an optimized rephasing pulse sequence (ORPS). ORPS is similar to CPMG but the pulse widths are optimized for the actual field distributions of the static and alternating fields. The alternative sequence may be used to maximize signal and minimize RF power consumption. The NMR signals include a longitudinal relaxation time constant (referred to as $T_1$) and a transverse relaxation time constant (referred to as $T_2$). The term "relaxation" relates to the nuclear magnetization precessing towards equilibrium. FIG. 2 depicts aspects of one spin echo 20. The spin echo 20 is a pulse of electromagnetic energy having a frequency f. An envelope 21 defines an outline of the spin echo pulse and may be used to illustrate a spin echo without showing the actual electromagnetic signal of frequency f.

Figure 3:
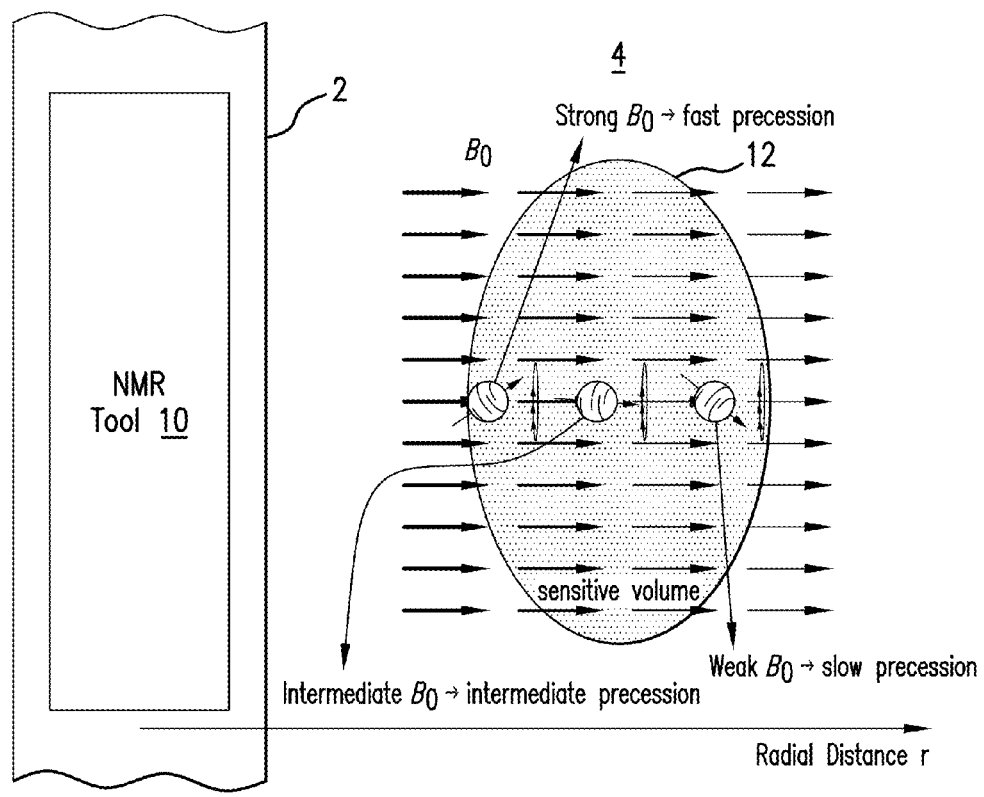
FIG. 3 depict aspects of a static magnetic field that decreases magnitude with increasing radial distance.

FIG. 3 illustrates the static magnetic field variation along the radius from the NMR tool 10. Specifically, FIG. 3 illustrates that the static magnetic field strength increases in the sensitive volume 12 as the field gets radially closer to the NMR tool 10. Conversely, the magnetic field strength decreases radially distant form the NMR tool 10. The angular frequency of precession (Larmor frequency) of nuclear spins increases as the static magnetic field strength increases, as demonstrated by:

$$\omega_0 = \gamma B_0 \quad \text{[Eq. 1]}$$

where $\omega_0$=Larmor frequency, $\gamma$=the gyromagnetic ratio, and $B_0$=the magnitude of the static magnetic field. To be clear, in an embodiment of an uphole application (where flow is through the magnet or the magnet surrounds a pipe in which there is flow), the focus is not on a radial variation in magnetic field strength, but on a variation in magnetic field strength in the direction of flow (e.g., a longitudinal variation along the axis of flow in a pipe).

In an underbalanced well system, formation fluid flows into a distant end of the sensitive volume 12 relative to the tool 10 and then exits the sensitive volume 12 at a near end relative to the tool 10 from where it then flows into the borehole 2. Conversely, in an overbalanced well system, mud filtrate may flow from the borehole 2 into the near end of the sensitive volume 12 and exit the sensitive volume 12 at the distant end. At the distant end of the sensitive volume 12, the strength of the static magnetic field $B_0$ is less than the strength of the static magnetic field $B_0$ at the near end of the sensitive volume 12 as shown in FIG. 3. Consequently, as the formation fluid or mud filtrate flows through the sensitive volume 12, the nuclear spins experience an increasing or decreasing $B_0$ with the resultant increase or decrease in the angular precession frequency $\omega_0$ where $\omega_0 = 2\pi f$. This change in frequency or frequency shift is observable. Thus, when the NMR tool 10 is kept stationary with respect to the borehole 2 axis, by the use of one or more stabilizers 13, for example, then any detected frequency shift can be attributed to fluid motion in the sensitive volume 12. In the case of an axisymmetric NMR tool 10, even some level of lateral movement can be tolerated without impeding the ability to measure radial flow. This is because, when the tool 10 moves, frequency shifts on either side of the tool 10 cancel each other because they have opposite signs. A reduction of the NMR signal amplitude is detected, but the frequency does not shift. In contrast, for a radial flow, the frequency shifts do not cancel each other on opposite sides of the tool 10. It is noted that the frequency shift is proportional to the rate of flow of the formation fluid in the sensitive volume 12. Hence, a measured frequency shift can be correlated to the downhole fluid flow. The frequency change or shift manifests itself as an increase or decrease in a center of gravity of the frequency spectrum of the spin echo signals. The center of gravity of a frequency spectrum can viewed as the average location of all the area under the spectrum.

It can be appreciated that the change in frequency of a received spin echo is equivalent to the spin echo being off resonance and can manifest itself as a phase change over the width of the spin echo with respect to the reference signal used for the phase-sensitive detection of the NMR signals. In one or more embodiments, the detected spin echo signals have an in-phase component (I) and a quadrature component (Q). The phase ($\phi$) of the NMR signal can be calculated as:

$\phi = a\tan(Q/I)$ for $I > 0$, $\phi = \pi/2$ for $I = 0$ and $Q > 0$, $\phi = a\tan(Q/I) + \pi$ for $I < 0$, and $\phi = -\pi/2$ for $I = 0$ and $Q < 0$.

With no motion, the phase of all echos may be the same in a CPMG. There may be some small phase change between the first two or three echoes in a CPMG sequence due to non-optimal RF pulse timings. There may also be some small phase variation within each echo even with no motion. The latter may be due to frequency offset between RF pulse and NMR echo that may be caused by non-uniformity of the static magnetic field and/or RF magnetic field. These errors are characterized when calibrating the NMR tool 10 such that additional phase variation can then be attributed to downhole fluid flow. Consequently, in one or more embodiments, the phase change in the spin echo signals can be used to determine the rate of flow of the downhole fluid through the sensitive volume 12 and into (in the case of formation fluid) or out of (in the case of mud filtrate) the borehole 2. In other embodiments, the downhole fluid flow may be determined from a variation of the frequency spectra of the echoes, determined by performing a Fourier transform on the NMR signals of the individual echoes or the signals obtained by averaging the detected quadrature signals of several echoes.

It can be appreciated that the NMR tool 10 can be calibrated to specific units for measuring flow through the sensitive volume 12. In one or more embodiments, the flow measurement capability of the NMR tool 10 can be calibrated in a borehole 2 having a known flow rate. In other embodiments, the NMR tool 10 can be calibrated in a laboratory setting representing a borehole having a known flow rate. In yet other embodiments, the flow measurement capability of the NMR tool 10 can be calibrated numerically by NMR simulation in an electronic computer.

Figure 4:
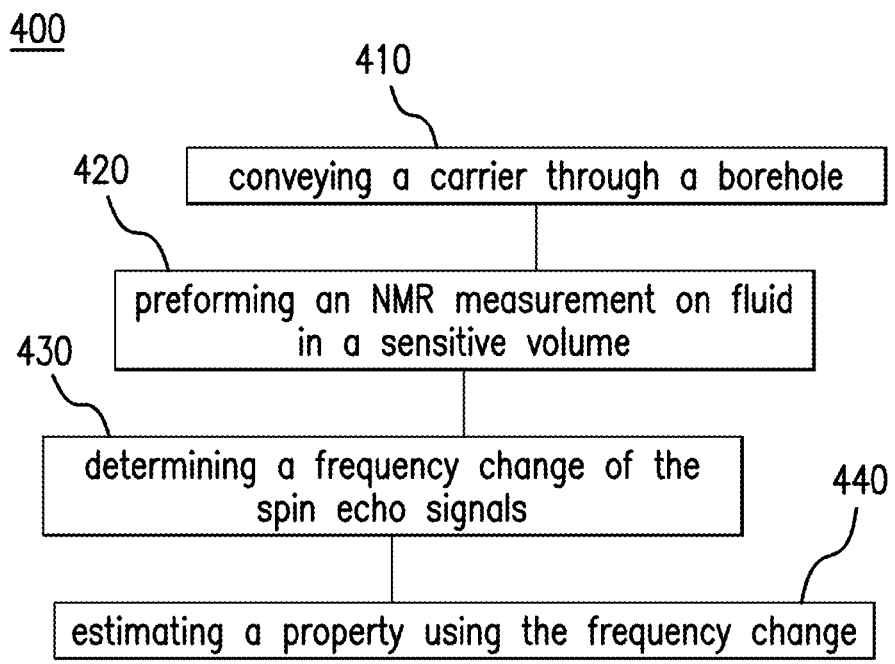
FIG. 4 illustrates the processes included in estimating a property of a fluid flow according to an embodiment of the present invention.

FIG. 4 illustrates the processes 400 included in estimating a property of a fluid flow according to an embodiment of the present invention. At block 410, conveying a carrier 5 through a borehole 2 penetrating an earth formation 4 includes the NMR tool 10 being disposed at the carrier 5. The process at block 410 is necessary when the property being estimated is a property of a downhole fluid flow. At block 420, performing a nuclear magnetic resonance (NMR) measurement on a fluid in a sensitive volume 12 includes using an NMR tool 10 configured to establish a magnetic field in the sensitive volume 12 that decreases in magnitude with increasing radial distance from the NMR tool 10. The NMR measurement includes spin echo signals where each spin echo signal n includes electromagnetic energy of a frequency $f_n$. Block 430 includes determining a frequency change of the spin echo signals from the NMR measurement. Block 440 includes estimating a property using the frequency change.

Figure 5A:
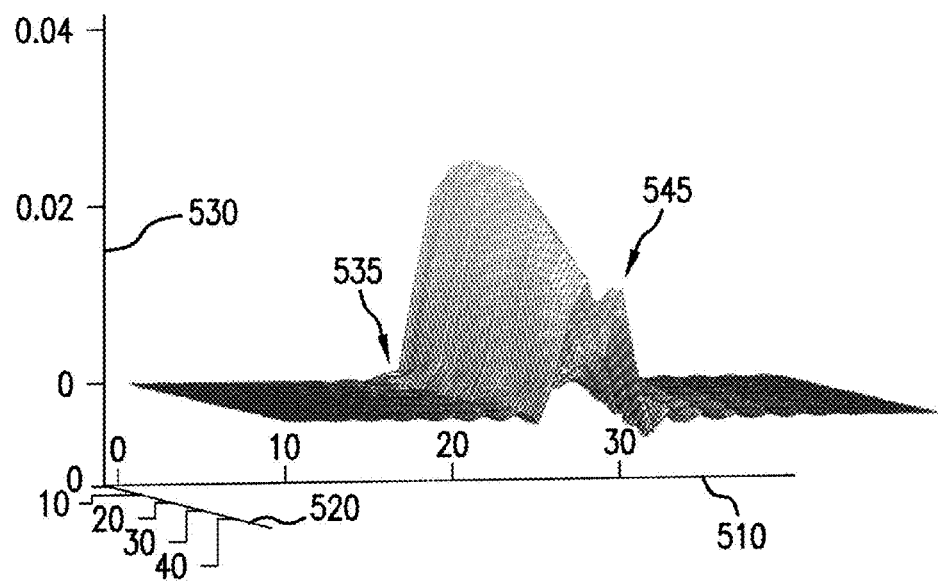
FIGS. 5a and 5b (collectively referred to as FIG. 5) depict different perspective views of frequency spectra of sequential simulated echoes of a CPMG-like spin-echo sequence according to an embodiment of the invention.
Figure 5B:
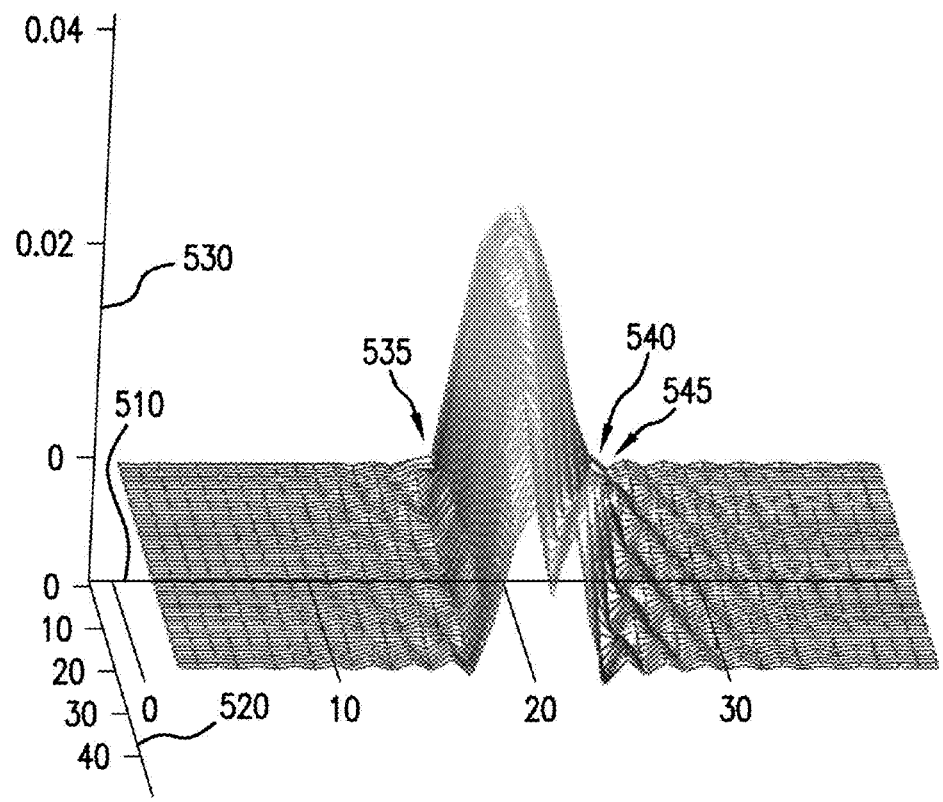

FIG. 5a and FIG. 5b depict different perspective views of frequency spectra of sequential simulated echoes of a CPMG-like spin-echo sequence (sequence from the back to the front of the viewing angle) according to an embodiment of an invention. In FIG. 5, the axis 510 is a (reverse) frequency axis (i.e., high frequencies are on the left and low frequencies are on the right), the axis 520 is a time axis, and the axis 530 is the amplitude axis. The frequency spectra of the individual echoes are obtained by performing a Fourier transformation on simulated NMR echoes. The NMR simulation includes the influence of radial flow toward the borehole 2. Along the axis 520, from the back to the front relative to the viewing angle, the high-frequency edge 535 of the echoes stays constant while the width of the spectrum begins to shrink. This is because the sensitive NMR volume is defined by the first pulses of the CPMG-like pulse sequence, and, due to the radial flow towards the borehole 2, fluid flows out of the sensitive volume at the high-frequency side (left) of the spectrum while new fluid enters the sensitive volume at the low-frequency side (right) of the spectrum. This change in the sensitive volume and especially of the location of the spins with respect to the gradient field changes the signal of the echo. This change is evident in the growing peak 545 at the low-frequency side 540. The new peak 545 is due to NMR signals being generated by fluid that has not seen the excitation pulse. Accordingly, if fluid flow were in the opposite direction, the new peak 545 would be on the high-frequency side (left) rather than the low-frequency side (right). As a result, direction of flow can be detected based on the side of the frequency spectrum with the new peak 545.

Figure 6A:
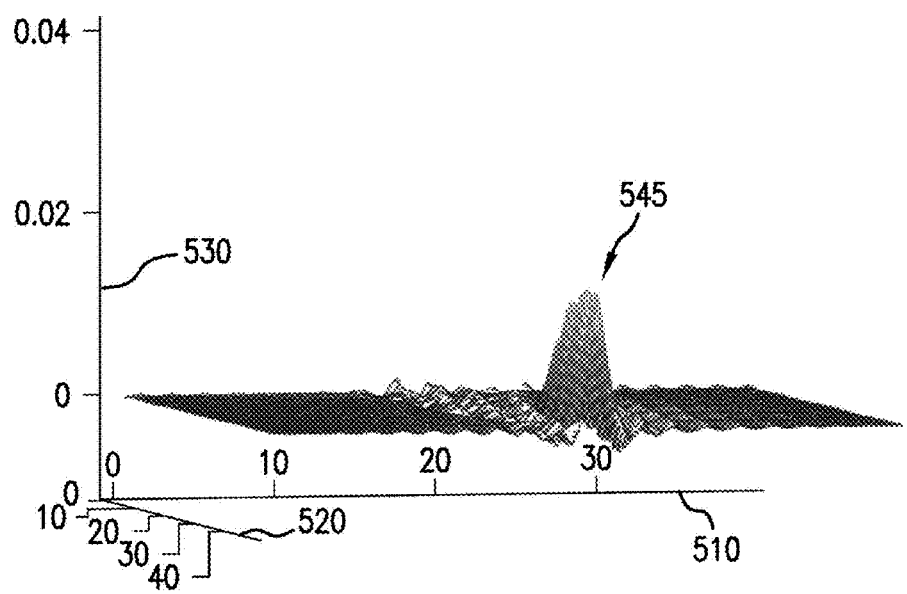
FIGS. 6a and 6b (collectively referred to as FIG. 6) depict different perspective views of frequency spectra of sequential simulated echoes without an excitation pulse of a CMPG-like sequence according to an embodiment of the invention.
Figure 6B:
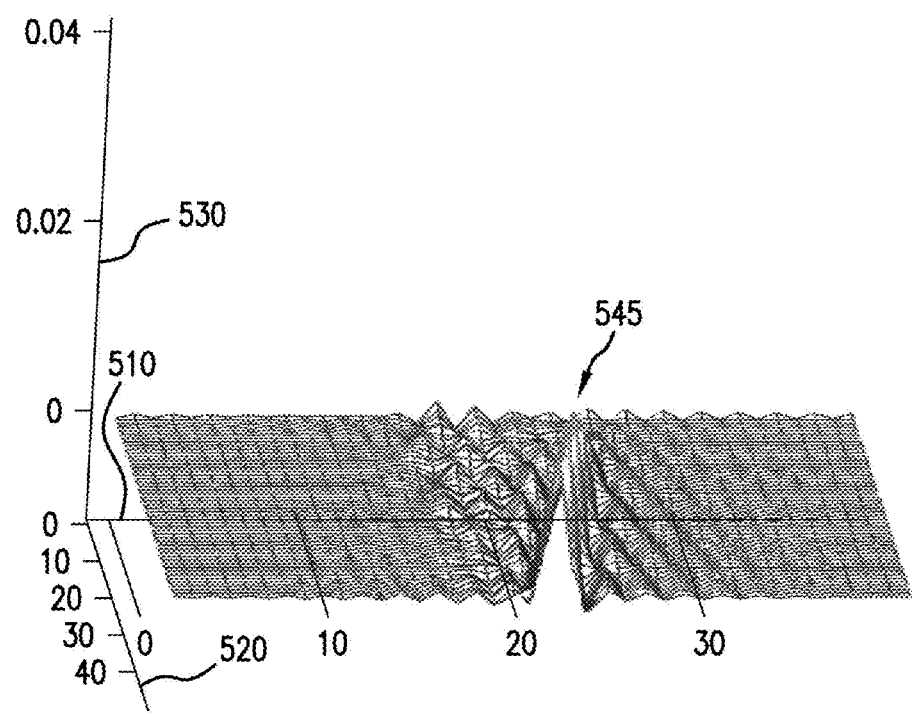

FIG. 6a and FIG. 6b depict different perspective views of frequency spectra of sequential simulated echoes without an excitation pulse (i.e. without first pulse) of a CMPG-like sequence according to an embodiment of an invention. The axes of FIG. 6 (510, 520, 530) are labeled the same as the axes of FIG. 5. FIG. 6 helps to show that the new peak 545 is due to NMR signals generated by fluid that has not been subjected to the excitation pulse. FIG. 6 shows that, when flow is present through the sensitive volume, NMR echoes are generated between refocus pulses without using an excitation pulse of the CPMG-like sequence. Thus, flow can be detected by using only refocusing pulses (without an excitation pulse). When a large number of refocus pulses (greater than 1000) is used, a steady state may be established whereby, when a flow is present, an endless sequence of NMR echoes is generated.

Figure 7A:
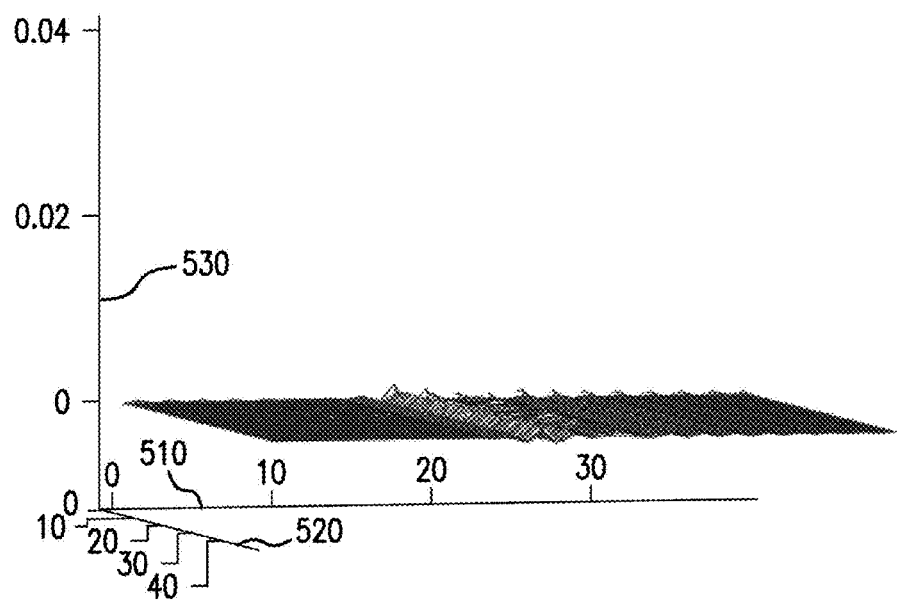
FIGS. 7a and 7b (collectively referred to as FIG. 7) depict different perspective views of frequency spectra obtained without an excitation pulse of a CMPG-like sequence according to an embodiment of the invention when no flow is present.
Figure 7B:
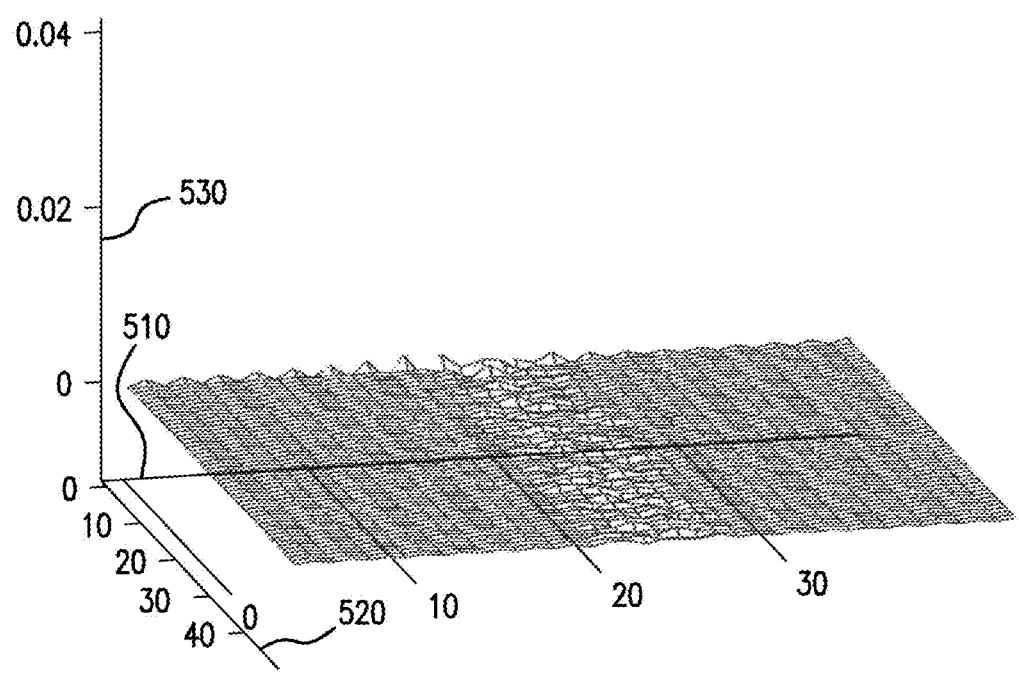

FIG. 7a and FIG. 7b depict different perspective views of frequency spectra obtained without an excitation pulse of a CMPG-like sequence according to an embodiment of the invention when no flow is present. The axes of FIG. 7 (510, 520, 530) are labeled the same as the axes of FIG. 5. Identical RF pulse sequences are used in FIGS. 6 and 7, but while flow is present in FIG. 6 there is no flow in FIG. 7. As a result, no NMR signals 545 are seen in FIG. 7.

Figure 8A:
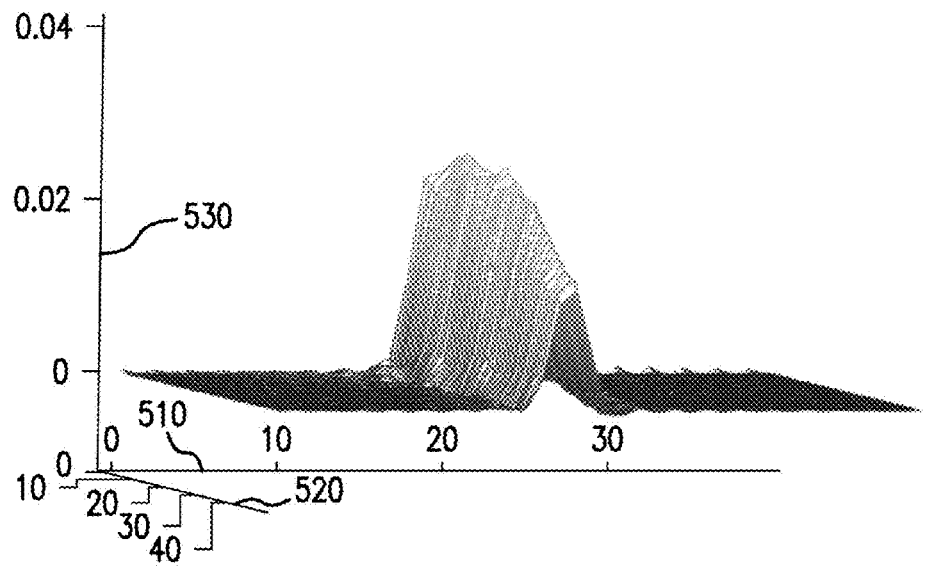
FIGS. 8a and 8b (collectively referred to as FIG. 8) depict different perspective views of frequency spectra of NMR echoes obtained by subtracting the NMR echoes that were used to generate FIG. 6 from the NMR echoes that were used to generate FIG. 5.
Figure 8B:
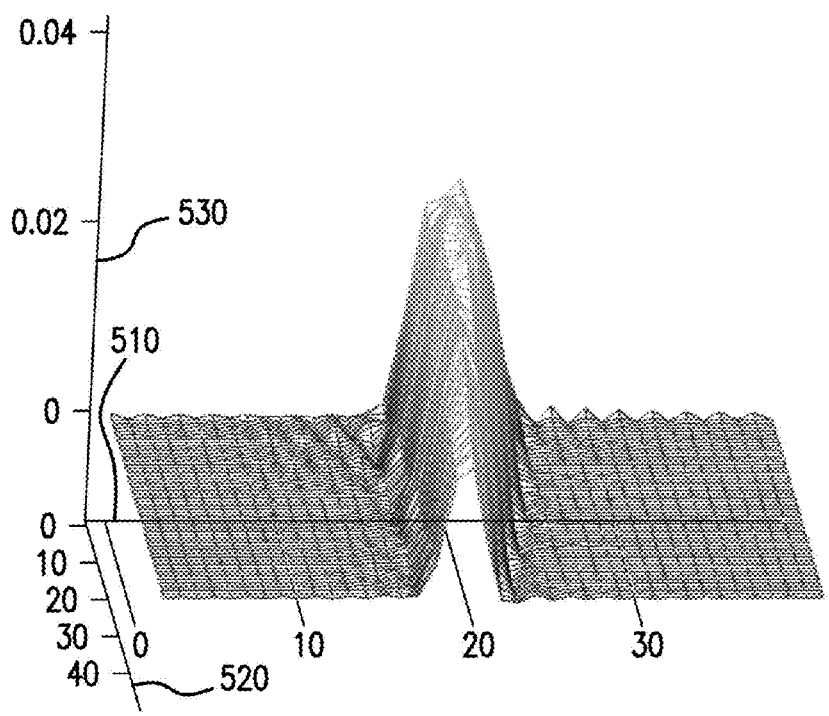

FIG. 8a and FIG. 8b depict different perspective views of frequency spectra of NMR echoes obtained by subtracting the NMR echoes that were used to generate FIG. 6 from the NMR echoes that were used to generate FIG. 5. The axes of FIG. 8

(510, 520, 530) are labeled the same as the axes of FIG. 5. By subtracting the NMR spectra of FIG. 6 from the NMR spectra of FIG. 5, the low-frequency peak 545 can be subtracted and the resulting spectrum may be easier to calibrate versus flow. The calibration measurement would need to combine the CPMG-like sequence with a similar sequence without an excitation pulse. Alternatively, instead of subtracting the Fourier transform outputs (NMR spectra), the complex NMR echoes can be subtracted prior to performing Fourier Transform.

The systems and methods described herein are not limited to the exemplary downhole environment or to a drilling scenario. For example, flow measurement or metering may be accomplished uphole (i.e., out of borehole), at a well head or pipeline, using NMR. The detection of flow using refocusing pulses without an excitation pulse is also not limited to downhole applications and may be accomplished in any environment using a static magnetic $B_0$ field with a field gradient and a refocus-pulse-only NMR sequence.

In support of the teachings herein, various analysis components may be used, including a digital and/or an analog system. For example, the downhole electronics 9 or the computer processing system 11 may include the digital and/or analog system. Each system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art.

It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottomhole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling a first component to a second component either directly or indirectly through an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus to detect a fluid flow, the apparatus comprising:
a nuclear magnetic resonance (NMR) tool configured to perform an NMR measurement on the fluid in a sensitive volume by establishing a magnetic field in the sensitive volume that exhibits a change in magnitude in a direction of the fluid flow when the fluid flow is radial with respect to the NMR tool and by transmitting refocus pulses, without any tipping pulse, to obtain the NMR measurement comprising spin echo signals; and
a processor configured to receive the NMR measurement from the NMR tool and determine whether the fluid flow exists based on an amplitude of the NMR measurement.

2. The apparatus according to claim 1, wherein the change in the magnitude of the magnetic field is an increase or a decrease.

3. The apparatus according to claim 1, wherein a magnitude of the magnetic field decreases with increasing radial distance from the NMR tool.

4. The apparatus according to claim 1, further comprising a carrier configured to be conveyed through a borehole, wherein the NMR tool is disposed at the carrier and the NMR measurement is performed in a formation penetrated by the borehole.

5. The apparatus according to claim 4, wherein the carrier comprises a wireline, a slickline, a drill string, or coiled tubing.

6. The apparatus according to claim 4, further comprising one or more stabilizers configured to reduce lateral movement of the NMR tool in the borehole.

7. The apparatus according to claim 1, wherein, when the fluid flow exists, the processor is further configured to determine a frequency or phase change of the spin echo signals from the NMR measurement.

8. The apparatus according to claim 7, wherein the frequency change comprises an increase in a center of gravity of a frequency spectrum of the spin echo signals.

9. The apparatus according to claim 7, wherein the frequency change comprises a decrease in a center of gravity of a frequency spectrum of the spin echo signals.

10. The apparatus according to claim 7, wherein the frequency change is determined by one of a changing phase error or a Fourier transform of the spin echo signals.

11. The apparatus according to claim 7, wherein the processor is further configured to estimate a flow rate and a direction of the fluid flow through the sensitive volume.

12. A method of detecting fluid flow, the method comprising:
performing a nuclear magnetic resonance (NMR) measurement on the fluid in a sensitive volume using an NMR tool configured to establish a magnetic field in the sensitive volume that exhibits a change in magnitude in a direction of the fluid flow when the fluid flow is radial with respect to the NMR tool and to transmit refocus pulses, without any tipping pulse, in the sensitive volume to obtain the NMR measurement, the NMR measurement comprising spin echo signals; and
determining whether the fluid flow exists based on an amplitude of the NMR measurement.

13. The method according to claim 12, wherein the performing the NMR measurement includes the NMR tool establishing the magnetic field that exhibits the change in the magnitude of the magnetic field to be an increase or a decrease, and the establishing the magnetic field includes the magnitude of the magnetic field decreasing with increasing radial distance from the NMR tool.

14. The method according to claim 12, further comprising conveying a carrier through a borehole and performing the NMR measurement, using the NMR tool disposed at the carrier, in a formation penetrated by a borehole.

15. The method according to claim 12, further comprising, when the fluid flow exists, determining a frequency or phase change of the spin echo signals from the NMR measurement.

16. The method according to claim 15, wherein the frequency change comprises an increase in a center of gravity of a frequency spectrum of the spin echo signals.

17. The method according to claim 15, wherein the frequency change comprises a decrease in a center of gravity of a frequency spectrum of the spin echo signals.

18. The method according to claim 15, wherein the frequency change is determined by one of a changing phase error or a Fourier transform of the spin echo signals.

19. The method according to claim 15, further comprising estimating a flow rate of the fluid flow through the sensitive volume.

20. A non-transitory computer readable medium comprising computer executable instructions which, when executed by a processor, cause the processor to perform a method of detecting fluid flow, the method comprising:
receiving a nuclear magnetic resonance (NMR) measurement on the fluid in a sensitive volume using an NMR tool configured to establish a magnetic field in the sensitive volume that changes in magnitude in a direction of the fluid flow when the fluid flow is radial with respect to the NMR tool and to transmit refocus pulses, without any tipping pulse, in the sensitive volume to obtain the NMR measurement, the NMR measurement comprising spin echo signals; and
determining whether the fluid flow exists based on an amplitude of the NMR measurement.

* * * * *